(12) United States Patent
Choi et al.

(10) Patent No.: US 12,266,390 B2
(45) Date of Patent: Apr. 1, 2025

(54) HOLOGRAM RECORDING SYSTEM

(71) Applicant: ELECTRONICS AND TELECOMMUNICATIONS RESEARCH INSTITUTE, Daejeon (KR)

(72) Inventors: Ki Hong Choi, Daejeon (KR); Kee Hoon Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/521,758

(22) Filed: Nov. 28, 2023

(65) Prior Publication Data

US 2024/0185886 A1 Jun. 6, 2024

(30) Foreign Application Priority Data

Dec. 1, 2022 (KR) .................. 10-2022-0165691
Oct. 5, 2023 (KR) .................. 10-2023-0132566

(51) Int. Cl.
*G11B 7/0065* (2006.01)
*G03H 1/04* (2006.01)

(52) U.S. Cl.
CPC ......... *G11B 7/0065* (2013.01); *G03H 1/0443* (2013.01); *G03H 2222/31* (2013.01); *G11B 2007/00653* (2013.01)

(58) Field of Classification Search
CPC ........ G11B 7/0065; G11B 2007/00653; G03H 1/0443; G03H 2222/31; G03H 2001/0458
See application file for complete search history.

(56) References Cited

U.S. PATENT DOCUMENTS 8,411,146 B2 * 4/2013 Twede .................. H04N 23/11
  348/148
8,630,037 B1 * 1/2014 Osterman ............ G02B 27/288
  359/350

(Continued)

FOREIGN PATENT DOCUMENTS

JP  2022-153080 A  10/2022
KR  10-1211845 B1  12/2012

(Continued)

OTHER PUBLICATIONS

Tatsuki Tahara et al., "Roadmap of incoherent digital holography," Applied Physics B, 2022, vol. 128, Issue 193.

*Primary Examiner* — Andrew Sasinowski

(57) ABSTRACT

The present disclosure relates to a hologram recording system that has an optical structure capable of replacing a polarization image sensor, thereby acquiring high-resolution holograms in real time by utilizing a high-resolution general image sensor. The hologram recording system for acquiring an interference pattern formed by self-interference of incident light from a target object is disclosed. The hologram recording system comprises a polarizer array including a plurality of polarizers, an image sensor including a plurality of pixels and an imaging optics disposed between the polarizer array and the image sensor. The imaging optics optically corresponds each of the plurality of polarizers to each of the plurality of pixels.

11 Claims, 7 Drawing Sheets

(56) References Cited

U.S. PATENT DOCUMENTS

| | | | |
|---|---|---|---|
| 2013/0135980 A1* | 5/2013 | Liu | G11B 7/24 |
| | | | 369/109.01 |
| 2015/0185699 A1 | 7/2015 | Yamamoto et al. | |
| 2018/0259904 A1* | 9/2018 | Georgiou | G02F 1/13725 |
| 2019/0250560 A1* | 8/2019 | Engel | G01B 9/021 |
| 2019/0346811 A1* | 11/2019 | Min | G03H 1/041 |
| 2021/0149338 A1 | 5/2021 | Min et al. | |
| 2022/0283541 A1 | 9/2022 | Kim et al. | |
| 2022/0397859 A1 | 12/2022 | Choi et al. | |

FOREIGN PATENT DOCUMENTS

| | | |
|---|---|---|
| KR | 10-2015-0037823 A | 4/2015 |
| KR | 10-2023664 B1 | 9/2019 |

\* cited by examiner

HOLOGRAM RECORDING SYSTEM

CROSS REFERENCE TO RELATED APPLICATION

The present application is based on and claims the benefit of priority to Korean Patent Application Number 10-2022-0165691, filed on Dec. 1, 2022, and Korean Patent Application Number 10-2023-0132566, filed on Oct. 5, 2023 in the Korean Intellectual Property Office, the entire disclosure of which is incorporated herein by reference.

TECHNICAL FIELD

The present disclosure relates to a hologram recording system, and more specifically, to a hologram recording system that records in real time with high resolution.

BACKGROUND

The statements in this section merely provide background information related to the present disclosure and may not constitute prior art.

Unlike conventional photographic techniques of recording only the intensity of light, holography acquires and records the amplitude and phase information of light propagated from an object.

Until now, there has been no sensor capable of directly recording amplitude and phase information of visible light, so the relevant information is indirectly acquired based on an interference phenomenon of light during acquisition. Interference is a phenomenon that occurs when two light waves, known as an object light and a reference light, interact with each other, but acquiring an interference pattern is challenging without using a laser that is a light with artificially aligned amplitude and phase. Therefore, until recently, lasers have been predominantly used in holography technology.

Self-interference holography acquires an interference pattern through a self-referencing approach that divides an incident wave emitted or reflected from an object based on a spatial or polarization state. The divided light waves are modulated and propagated into wavefronts with different curvatures under the influence of an interferometer or polarization modulator, forming an interference pattern on an image sensor. At this point, the interference occurs between twin light waves originating from a light originating from the same space and time, and thus, it is free from light source conditions compared to normal interference conditions that rely on lasers. Therefore, recording is possible under fluorescent, bulb, LED, or natural light conditions.

SUMMARY

An object of the present disclosure is to provide a hologram recording system that has an optical structure capable of replacing a polarization image sensor, thereby acquiring high-resolution holograms in real time by utilizing a high-resolution general image sensor.

According to one aspect of the present disclosure, there is provided a hologram recording system for acquiring an interference pattern formed by self-interference of incident light from a target object, comprising: a polarizer array including a plurality of polarizers; An image sensor including a plurality of pixels; and an imaging optics disposed between the polarizer array and the image sensor, wherein the imaging optics optically corresponds each of the plurality of polarizers to each of the plurality of pixels.

According to an embodiment of the present disclosure, by acquiring spatially separated interference patterns of different phases, it is possible to record not just a static object but also a dynamic object changing over time and enables holographic video recording.

According to an embodiment of the present disclosure, it is possible to acquire a high-resolution hologram in real-time by acquiring individually a phase-shifted interference pattern for each pixel on a high-resolution general image sensor, irrespective of the limited specifications of commercially available polarization image sensors.

The problems to be solved by the present disclosure are not limited to those mentioned above, and other problems not mentioned will be clearly understood by those skilled in the art from the description below.

DETAILED DESCRIPTION

Figure 1:
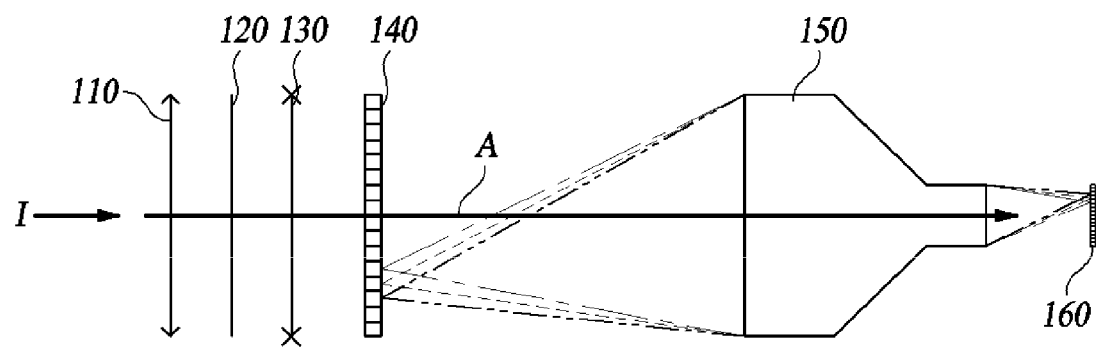
FIG. 1 is a schematic diagram of a hologram recording system according to an embodiment of the present disclosure.

Embodiments of the present disclosure are described below in detail using various drawings. It should be noted that when reference numerals are assigned to components in each drawing, the same components have the same reference numerals as much as possible, even if they are displayed on different drawings. Furthermore, in the description of the present disclosure, where it has been determined that a specific description of a related known configuration or function may obscure the gist of the disclosure, a detailed description thereof has been omitted.

In describing the components of the embodiments according to the present disclosure, symbols such as first, second, i), ii), a), and b) may be used. These symbols are only used to distinguish components from other components. The identity or sequence or order of the components is not limited by the symbols. In the specification, when a part "includes" or is "equipped with" an element, this means that the part may further include other elements, not excluding other elements unless explicitly stated to the contrary. Further, when an element in the written description and claims is described as being "for" performing or carry out a stated function, step, set of instructions, or the like, the element may also be considered as being "configured to" do so.

Detailed description to be disclosed with accompanying drawings is to describe exemplary embodiments of the present disclosure and is not to represent the only embodiment that the present disclosure may be implemented.

Embodiments of the present disclosure relate to a self-interference hologram recording system that acquires an interference pattern formed by self-interference of light from a target object under a fluorescent, bulb, LED, or natural light condition.

For self-interference, a wavefront modulator is required to split an incident light entering the system into two halves and modulate the two halves separately. There are examples where the traditional Michelson interferometer structure is adopted to spatially separate and modulate a wavefront, which is then recombined to acquire a self-interference pattern. Meanwhile, by using a component with polarization selectivity, wavefront modulation and interference are allowed without splitting a path of an incident light into two. Representative examples include systems that utilize a phase-only spatial light modulator (SLM), a birefringent lens, a liquid crystal lens, or a geometric phase lens. These elements commonly divide the polarization state of an incident light into vertical and horizontal components or left and right components, and modulate the curvature of one or both components differently.

Equation 1 indicates that when two light waves $\psi_1$ and $\psi_2$ traveling in the same direction interfere with each other, three terms are generated. Here, a desired complex hologram is $\psi_1\psi^*_2$, where $|\psi_1|^2+|\psi_2|^2$ represents the light source information and, $\psi^*_1\psi_2$ represents the twin-image of the hologram.

$$|\psi_1+\psi_2|^2=|\psi_1|^2+|\psi_2|^2+\psi_1\psi^*_2+\psi^*_1\psi_2 \qquad \text{Equation 1}$$

In order to utilize the full resolution of an image sensor, the traveling direction of the two interfering light waves must be the same, and in this case, the light source information and the twin image information are recorded together in an overlapping manner in the complex hologram to be acquired, as shown in Equation 1. Because both the light source and twin-image information act like noise when reconstructing the hologram, it brings the effect of lowering the quality of a holographic image, and thus, a technology to remove the noise is required.

A representative method for extracting only a complex hologram from Equation 1 is phase shift holography. The phase shift method is a method of assigning a relative phase shift difference of 0, 90, 180, and 270 degrees to two interfering light waves and then combining the light waves through Equation 2 (only the representative four-step phase shift technique is described).

$$\psi_1\psi^*_2=c_0[(I_{180°}-I_0°)-j(I_{270°}-I_{90°})] \qquad \text{Equation 2}$$

In Equation 2, $c_0$ is a real number, and $I_\delta$ is an interference pattern with a phase difference equal to $\delta$. In order to apply a phase difference between two interfering light waves, methods such as adjusting a relative optical path difference, providing a phase delay, or adjusting a geometric phase are commonly used.

Images acquired using the phase shift method may be acquired sequentially over time, but may also be acquired in a spatially divided manner using a polarization image sensor. In this case, on a surface of the polarization image sensor, a phase-shifted interference pattern divided (mostly) into four regions with phases shifted differently is recorded, and a complex hologram is acquired by extracting four separate images on a computer from the interference pattern and processing the extracted four separate images as described in Equation 2. The drawback of this method is that only ¼ of the image sensor's resolution is used, and the advantage is that only one exposure is sufficient to acquire a single hologram, and thus, it is possible to record not just a static object but also an object changing over time, such as biological specimens and enable hologram video recording.

FIG. 1 is a schematic diagram of a hologram recording system according to an embodiment of the present disclosure.

Referring to FIG. 1, a hologram recording system according to an embodiment of the present disclosure may include a geometric phase lens 130, a polarizer array 140, an imaging optics 150, and an image sensor 160, and acquires an interference pattern formed by self-interference of an incident light I from a target object (not shown). As shown in the drawing, the geometric phase lens 130, the polarizer array 140, the imaging optics 150, and the image sensor 160 are all aligned along one optical axis A.

The geometric phase lens 130 is a wavefront modulator, which splits an incident light into two light waves traveling in the same direction and changes the two light waves to left-circular polarization and right-circular polarization, respectively. At this point, a polarizer 120 may be disposed in front of the geometric phase lens 130, and an objective lens 110 may be disposed in front of the polarizer 120. In this case, "front" refers to the reverse direction of the sequential forward direction in which an incident light enters the hologram recording system and reaches the image sensor.

In embodiments of the present disclosure, the incident light is a light from a target object, and, for example, a light source may be fluorescent, a light bulb, an LED, or natural light, etc., and the target object may reflect or scatter a light from these light sources or be self-luminous, and the incident light may be a light reflected, scattered, or self-emitted from the target object and travel into the hologram recording system.

In some embodiments, the incident light I from the target object sequentially passes through the objective lens 110, the polarizer 120, and the geometric phase lens 130. The incident light I is converged by the objective lens 110 and changed into a linearly polarized light by the polarizer 120. The linearly polarized incident light I is split by the geometric phase lens 130 into two light waves of right-circular polarization and left-circular polarization with the same traveling direction. An interference pattern is generated by the interference of the left-circularly polarized light wave and a right-circularly polarized light wave. The interference pattern is generated on the image sensor 160 and acquired by the image sensor 160.

Figure 2A:
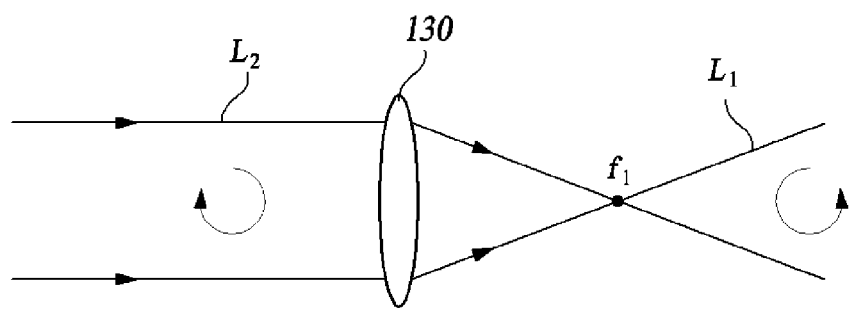
FIGS. 2A, 2B and 2C are diagrams for explaining characteristics of a geometric phase lens according to embodiments of the present disclosure.
Figure 2B:
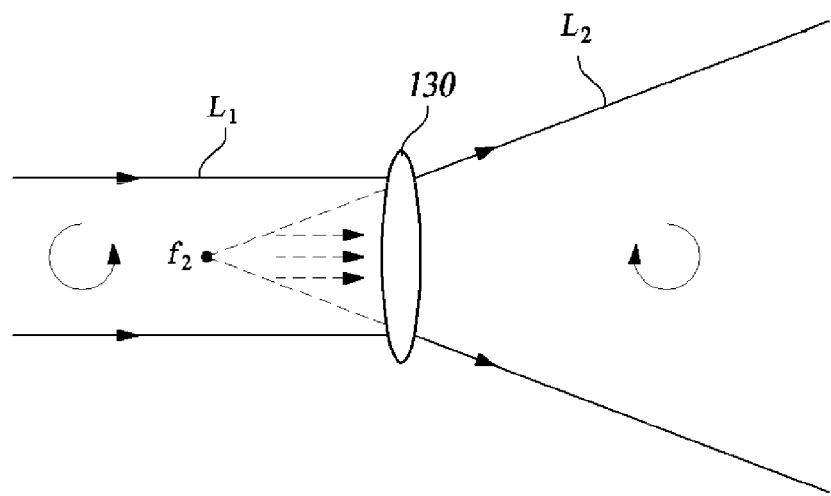
Figure 2C:
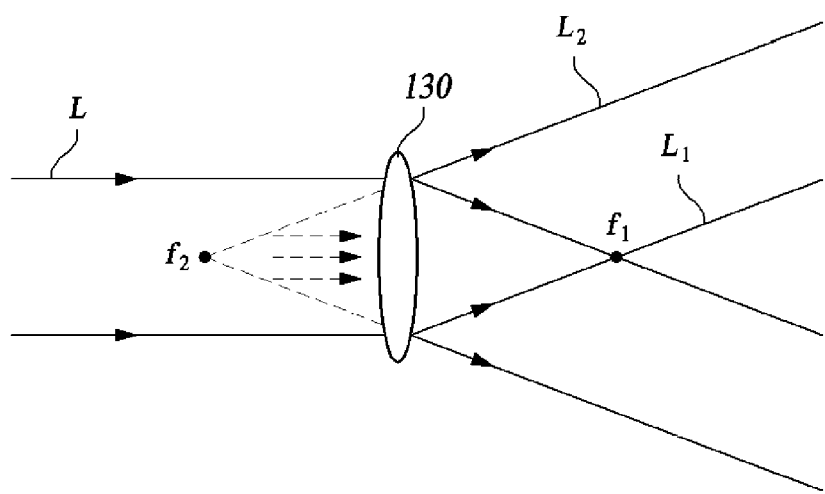

FIGS. 2A, 2B and 2C are diagrams for explaining characteristics of a geometric phase lens according to embodiments of the present disclosure.

Referring to FIGS. 2A, 2B and 2C, the geometric phase lens 130 has both negative and positive focal points. In other words, the geometric phase lens has polarization selectivity, causing an incident light with right-circular polarization to change to a left-circularly polarized light converging at the positive focal point and an incident light with left-circular polarization to change to a right-circularly polarized light diverging at the negative focal point.

For reference, circular polarization means that the direction of vibration of an electric field vector (or magnetic field vector) of a light wave is circular. A circularly polarized light whose electric field vector rotates clockwise relative to the observer is referred to as a right-circularly polarized light, and a circularly polarized light whose electric field vector rotates counterclockwise is referred to as a left-circularly polarized light.

The geometric phase lens is a thin-film passive element that acts as a concave or convex lens depending on the circularly polarization state of an incident light, so when a linearly polarized light enters, the geometric phase lens acts as a concave lens for one half and as a convex lens for the other half, modulating the wavefront accordingly. Using this lens, the overall size of the self-interference holographic recording system may be reduced to less than a few centimeters.

As shown in FIG. 2A, the geometric phase lens 130 has a positive focal point $f_1$ for a light of right-circular polarization $L_2$. When a parallel light of right-circularly polarization $L_2$ is incident on the geometric phase lens 130, a light changed to left-circularly polarization $L_1$ is converged at the positive focal point $f_1$.

Meanwhile, as shown in FIG. 2B, the geometric phase lens 130 has a negative focal point $f_2$ for a light of left-circular polarization $L_1$. When a parallel light of left-circular polarization $L_1$ is incident on the geometric phase lens 130, a light changed to right-circular polarization $L_2$ diverges from the negative focal point $f_2$.

As shown in FIG. 2C, when an unpolarized or linearly polarized light L is incident on the geometric phase lens 130, a portion of the light is changed into a left-circularly polarized light converging at the positive focal point, while the rest is changed to a right-circularly polarized light diverging from the negative focal point.

In some embodiments, the geometric phase lens 130 creates a condition for self-interference by splitting the incident light I from the target object into a left-circularly polarized light and a right-circularly polarized light. A maximum amount of light is collected from the target object by the objective lens 110 to form an incident light, and the incident light I is linearly polarized by the polarizer 120. One half of the linearly polarized incident light is modulated by the geometric phase lens 130 into a left-circularly polarized light, while the other half is modulated into a right-circularly polarized light. The left-circularly polarized light and the right-circularly polarized light interfere with each other to form an interference pattern containing information on the target object.

Figure 3:
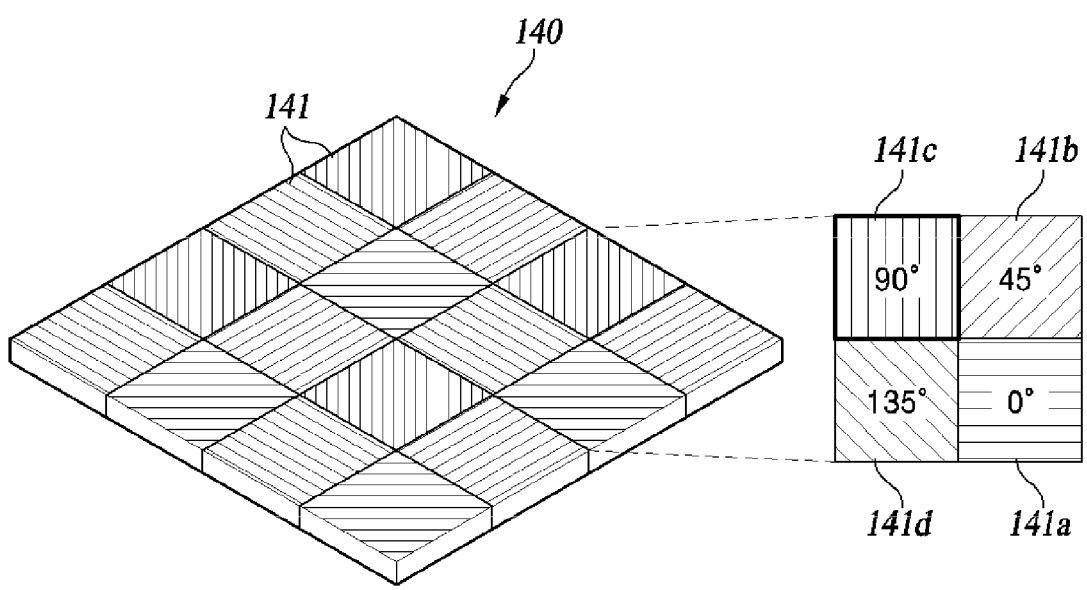
FIG. 3 is an exemplary diagram of a polarizer array according to embodiments of the present disclosure.

FIG. 3 is an exemplary diagram of a polarizer array according to embodiments of the present disclosure.

Referring to FIG. 3, the polarizer array 140 includes a plurality of polarizers 141, and spatially dividing two light waves, interfering each other by passing through the geometric phase lens, to provide different phase differences. That is, the polarizer array 140 is a spatial division phase shift means and, as described above, provides a relative phase difference to the two interfering light waves in order to extract only a complex hologram.

In the illustrated embodiment, the plurality of polarizers 141 are arrayed in a matrix form. In addition, each of the plurality of polarizers 141 is a linear polarizer that converts an incident light into a linearly polarized light, and each polarizer has a different polarization axis. The plurality of polarizers has one of four polarization axes 141a, 141b, 141c, and 141d of 0°, 45°, 90°, and 135° that differ by 45°. Micro-polarizers having the four different polarization axes 141a, 141b, 141c, and 141d all have the same size and are arrayed in a 2×2 matrix. In this case, the polarizer array 140 includes a plurality of polarizers 141 in which the 2×2 matrix array having the four different polarization axes 141a, 141b, 141c, and 141d is arrayed repeatedly in plane.

In another embodiment, a plurality of polarizers has one of three polarization axes of 0°, 60°, and 120° that differ by 60°. In this case, the plurality of polarizers may have, for example, a regular hexagonal shape and may be arrayed in a honeycomb structure.

The polarizer array 140 is in a structure where a plurality of polarizers having different polarization axes are arrayed in two dimensions, thereby spatially dividing two interfering light waves using the plurality of polarizers to provide different phase differences. The polarizer array 140 may be configured to spatially divide two interfering light waves to provide different phase differences to the divided regions. If the polarizer array 140 is designed to allow spatial phase shift, as described above, the polarizer array 140 may include various variations in terms of the arrangement and polarization axes of the plurality of polarizers.

In the case of using the polarizer array 140, which is a spatial array of a plurality of polarizers having different polarization axes, the hologram recording system of the present disclosure may, rather than shifting a phase in a time-sequential manner, simultaneously acquire a plurality of phase-shifted interference patterns in a spatial division manner.

Figure 4:
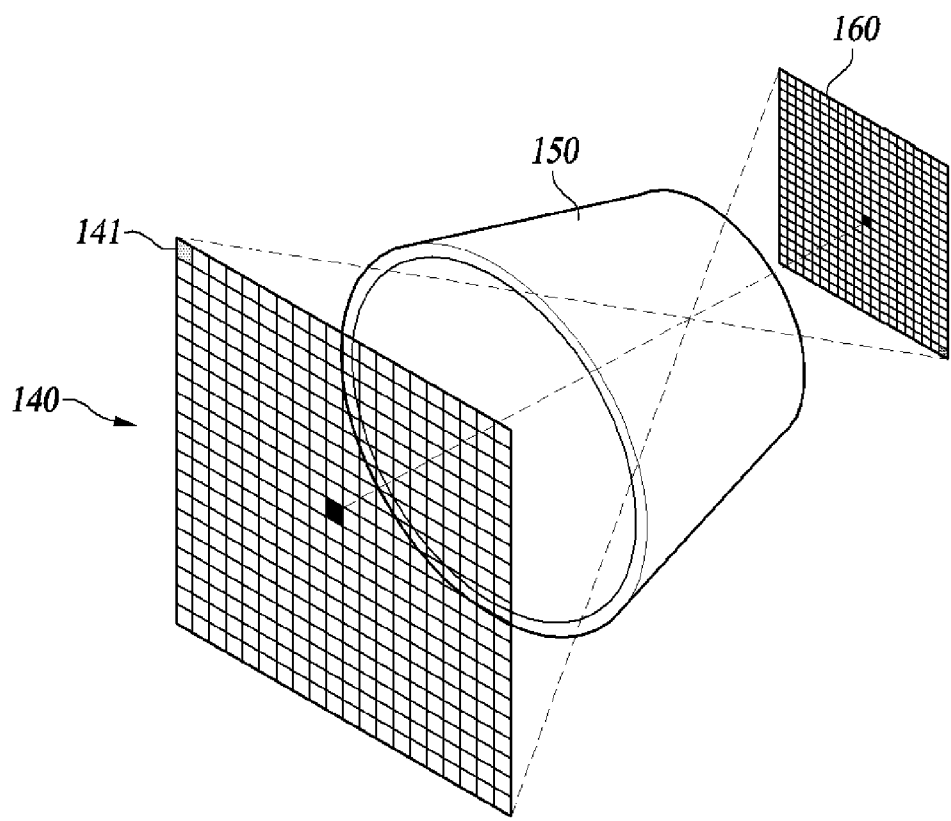
FIG. 4 shows part of a hologram recording system according to an embodiment of the present disclosure.

FIG. 4 shows part of a hologram recording system according to an embodiment of the present disclosure.

Referring to FIG. 4, a hologram recording system of the present disclosure includes a polarizer array 140, an imaging optics 150, and an image sensor 160. A plurality of interference patterns phase-shifted by the polarizer array 140 in a spatial division manner is acquired by the image sensor 160.

In embodiments, the image sensor 160 is a typical image sensor comprised of a planar array of photodiodes whose current amount changes depending on the intensity of incident light. A photodiode represents a pixel. In addition, the image sensor 160 may include a color filter. The color filter may be in the form of an array in which a plurality of color filters is arrayed in plane, and the color filter array may be attached to the image sensor.

A polarization image sensor is used to acquire a self-interference hologram in real time. Since polarizers having different polarization axes are attached to the pixel array, the polarization image sensor has the advantage of being able to detect a different brightness of a light depending on the polarization state of the light. In order to improve hologram acquisition quality, the pixel size must be small (high density) and the number of pixels must be large (high resolution). As wider and more detailed interference patterns are acquired using a high-density and high-resolution image sensor, the quality of a restored hologram image may be improved. However, commercially available polarization image sensors have limited specifications in terms of the number and size of pixels.

The hologram recording system according to the present disclosure utilizes a general image sensor with high resolution and high density and has an optical structure that can replace a polarization image sensor. The system of the present disclosure includes the polarizer array 140 and imaging optics 150 which are disposed in front of the image sensor 160. The polarizer array 140, the imaging optics 150, and the image sensor 160 are sequentially aligned with respect to an optical axis A behind the geometric phase lens 130.

As shown in the drawing, a plurality of interference patterns phase-shifted by the polarizer array 140 in a spatial division manner pass through the imaging optics 150 and reach the image sensor 160. At this point, the imaging optics 150 optically corresponds each of a plurality of polarizers 141 in the polarizer array 140 to a corresponding one of the plurality of pixels in the image sensor 160. Lights from the plurality of polarizers 141 are imaged in the plurality of pixels by the imaging optics 150. The imaging optics 150 is aligned so that brightness information of a light from each of the plurality of polarizers is assigned to one pixel of the image sensor. Accordingly, the image sensor 160 simultaneously acquires individual interference patterns having different phases for the respective pixels.

The imaging optics 150 includes at least one lens, and may be referred to as a reduction optical system when a size of the plurality of pixels is smaller than a size of the plurality of polarizers. In the illustrated embodiment, for the ease of manufacturing the polarizer array, the size of the plurality of polarizers may be larger than the size of the plurality of pixels. In this case, for optical one-to-one correspondence between the plurality of polarizers and the plurality of pixels, a magnification of the imaging optics corresponds to a ratio between the size of the plurality of polarizers and the size of the plurality of pixels. The imaging optics may be configured to adjust a magnification based on the sizes of the plurality of polarizers and plurality of pixels.

Figure 5:
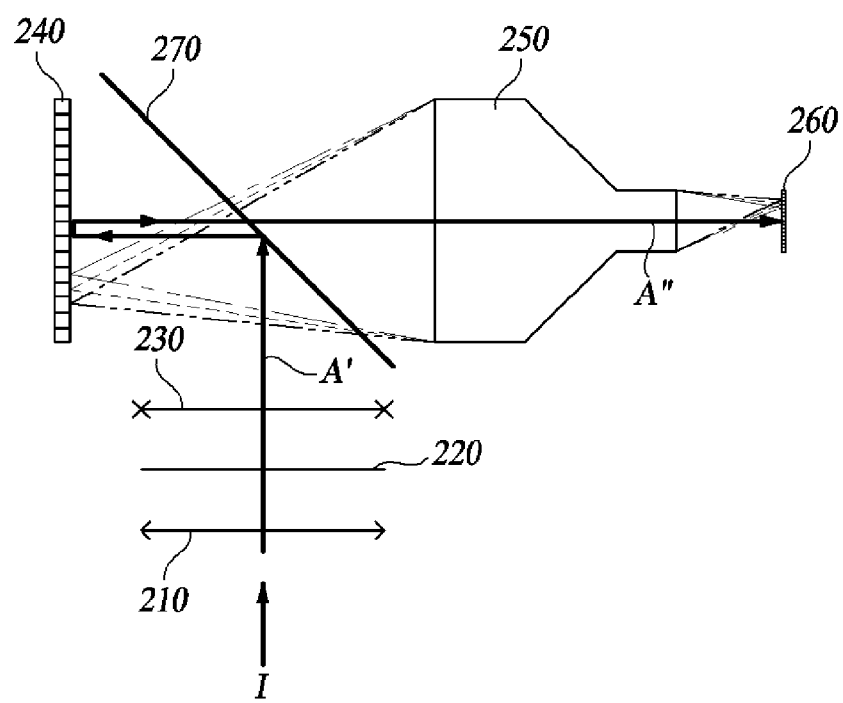
FIG. 5 is a schematic diagram of a hologram recording system according to another embodiment of the present disclosure.

FIG. 5 is a schematic diagram of a hologram recording system according to another embodiment of the present disclosure.

Referring to FIG. 5, a polarizer array 240 is reflective and includes a plurality of polarizers. Except for being reflective, the plurality of polarizers has the same optical characteristics as the plurality of polarizers 141 of the polarizer array 140. On the other hand, in the above-described embodiments, the polarizer array 140 is transmissive, the light passing through the geometric phase lens 130 also passes through the polarizer array 140, and the light passing through the polarizer array 140 travels in the same direction as the incident light I along the optical axis A. In this embodiment, the polarizer array 240 is reflective, the light incident on the polarizer array 240 is reflected by the polarizer array 240, and the light reflected by the polarizer array 240 travels in the opposite direction to the incident direction.

In the illustrated embodiment, the hologram recording system further includes an optical element 270 disposed between the polarizer array 240 and an imaging optics 250. The optical element 270 is configured to reflect the incident light I passing through the geometric phase lens 130, traveling along an optical axis A', toward the polarizer array 240 and then transmit the reflected light from the polarizer array 240. In this case, the optical element 270 is a half mirror.

The polarizer array 240, the optical element 270, the imaging optics 250, and the image sensor 260 are sequentially aligned with respect to an optical axis A". In this embodiment, the only difference from the above-described embodiments is that the polarizer array 240 is reflective, while the other components are the same. Therefore, a description of the other components in this embodiment is omitted.

The embodiments of the present disclosure may be summarized as follows.

A hologram recording system according to an embodiment is a hologram recording system that acquires an interference pattern formed by self-interference of incident light from a target object, including: a polarizer array including a plurality of polarizers; an image sensor including a plurality of pixels; and an imaging optics disposed between the polarizer array and the image sensor, wherein the imaging optics optically corresponds each of the plurality of polarizers to a corresponding one of the plurality of pixels.

In some embodiments, a magnification of the imaging optics is a ratio between a size of each polarizer of the plurality of polarizers and a size of each pixel of the plurality of pixels.

In some embodiments, the size of each polarizer of the plurality of polarizers is larger than the size of each pixel of the plurality of pixels.

In some embodiments, the plurality of polarizers convert incident light into linearly polarized light, and the plurality of polarizers has different polarization axes.

In some embodiments, the plurality of polarizers have one of four polarization axes that differ by 45°.

In some embodiments, the plurality of polarizers has one of three polarization axes that differ by 60°.

In some embodiments, a geometric phase lens changes the incident light to left-circular and right-circular polarization.

In some embodiments, the polarizer is disposed in front of the geometric phase lens and changes the incident light into linearly polarized light.

In some embodiments, the hologram recording system further includes an objective lens disposed in front of the polarizer and converging the incident light.

In some embodiments, the polarizer array is reflective, and the hologram recording system further includes an optical element disposed between the polarizer array and the imaging optics and configured to reflect the incident light toward the polarizer array and then transmit the reflected light from the polarizer array.

At least some of the components described in the exemplary embodiments of the present disclosure may be implemented as hardware elements including at least one of a Digital Signal Processor (DSP), a processor, a controller, an Application-Specific IC (ASIC), a programmable logic devices (FPGA, etc.), other electronic components, or a combination thereof. Moreover, at least some of the functions or processes described in the exemplary embodiments may be implemented as software, and the software may be stored in a recording medium. At least some of the components, functions, and processes described in the exemplary embodiments of the present disclosure may be implemented as a combination of hardware and software.

The method according to the exemplary embodiments of the present disclosure may be written as a program that can be executed on a computer and may also be implemented as various recording media such as magnetic storage media, optical reading media, digital storage media, etc.

Various techniques described herein may be implemented in digital electronic circuitry, or in computer hardware, firmware, software, or combinations thereof. Implementations may be in the form of a computer program tangibly embodied in a computer program product, i.e., an information carrier, e.g., a machine-readable storage device (computer-readable medium) or a propagated signal, for processing by, or controlling, the operation of, a data processing device, e.g., a programmable processor, a computer, or a number of computers. A computer program, such as the above-mentioned computer program(s), may be written in any form of programming language, including compiled or interpreted languages and may be deployed in any form, including as a stand-alone program or as a module, component, subroutine, or other unit suitable for use in a computing environment. The computer program may be deployed to run on a single computer or multiple computers at one site or distributed across multiple sites and interconnected by a communications network.

Processors suitable for processing computer programs include, by way of example, both general purpose and special purpose microprocessors, as well as one or more processors of any kind of digital computer. Generally, a processor will receive instructions and data from a read-only memory or a random access memory or both. The essential elements of a computer may include at least one processor that executes instructions and one or more memory devices that store instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include, by way of example, semiconductor memory devices, e.g., Magnetic Media such as hard disks, floppy disks, and magnetic tapes, Optical Media such as Compact Disk Read Only Memories (CD-ROMs) and Digital Video Disks (DVDs), Magneto-Optical Medial such as Floptical Disks, Rea Only Memories (ROMs), Random Access Memories (RAMs), flash memories, Erasable Programmable ROMs (EPROMs), Electrically Erasable Programmable ROMs (EEPROM), etc. The processor and the memory may be supplemented by, or incorporated in, special purpose logic circuitry.

The processor may execute an Operating System and software applications executed on the Operating System. Moreover, a processor device may access, store, manipulate, process, and generate data in response to software execution. For the sake of convenience, there is a case where a single processor device is used, but those skilled in the art will understand that the processor device can include multiple processing elements and/or multiple types of processing elements. For example, the processor device may include a plurality of processors or a single processor and a single controller. Other processing configurations, such as such as parallel processors, are also possible.

In addition, non-transitory computer-readable media may be any available media that can be accessed by a computer, and may include both computer storage media and transmission media.

This specification includes details of various specific implementations, but they should not be understood as limiting the scope of any invention or what is claimed, and should be understood as descriptions of features that may be unique to particular embodiments of a particular invention. In the context of individual embodiments, specific features described herein may also be implemented in combination with a single embodiment. On the contrary, various features described in the context of a single embodiment can also be implemented in multiple embodiments independently or in any appropriate sub-combination. Further, although the features may operate in a particular combination and may be initially described as so claimed, one or more features from the claimed combination may be in some cases excluded from the combination, and the claimed combination may be modified into a sub-combination or a variation of the sub-combination.

Likewise, although the operations are depicted in the drawings in a particular order, it should not be understood that such operations must be performed in that particular order or sequential order shown to achieve the desirable result or that all the depicted operations should be performed. In certain cases, multitasking and parallel processing may be advantageous. Moreover, the separation of various device components of the above-described embodiments should not be understood as requiring such separation in all embodiments, and it should be understood that the described program components and devices can generally be integrated together in a single software product or packaged into multiple software products.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments. The scope of protection of the various embodiments should be construed by the following claims. All technical ideas that fall within the scope of equivalents thereof should be interpreted as being included in the scope of the present embodiments.

What is claimed is:

1. A hologram recording system acquiring an interference pattern formed by self-interference of incident light from a target object and comprising:
    a geometric phase lens converting the incident light into left-circular polarization and right-circular polarization;
    a polarizer array including a plurality of polarizers;
    an image sensor including a plurality of pixels; and
    an imaging optics disposed between the polarizer array and the image sensor,
    wherein the imaging optics optically corresponds each of the plurality of polarizers to a corresponding one of the plurality of pixels.

2. The hologram recording system of claim 1, wherein a magnification of the imaging optics is a ratio between a size of each polarizer of the plurality of polarizers and a size of each pixel of the plurality of pixels.

3. The hologram recording system of claim 1, wherein the size of each polarizer of the plurality of polarizers is larger than the size of each pixel of the plurality of pixels.

4. The hologram recording system of claim 1,
    wherein the plurality of polarizers converts incident light into linearly polarized light, and
    wherein the plurality of polarizers has different polarization axes.

5. The hologram recording system of claim 4, wherein each of the plurality of polarizers has one of four polarization axes that differ by 45°.

6. The hologram recording system of claim 4, wherein each of the plurality of polarizers has one of three polarization axes that differ by 60°.

7. The hologram recording system of claim 1, further comprising:
    a polarizer disposed in front of the geometric phase lens and changing the incident light into linearly polarized light.

8. The hologram recording system of claim 7, further comprising:
    an objective lens disposed in front of the polarizer and converging the incident light.

9. The hologram recording system of claim 1,
    wherein the polarizer array is reflective, and
    wherein the hologram recording system further comprises an optical element disposed between the polarizer array and the imaging optics and configured to reflect the incident light to the polarizer array and transmit light from the polarizer array.

10. The hologram recording system of claim 1, wherein the plurality of polarizers converts incident light into linearly polarized light, and includes at least three polarizers each having different respective polarization axes.

11. The hologram recording system of claim 1, wherein the image sensor, the geometric phase lens, and the polarizer array are each disposed along a same optical axis.

* * * * *